(12) United States Patent
Schmit et al.

(10) Patent No.: US 10,027,555 B2
(45) Date of Patent: Jul. 17, 2018

(54) VISUAL DIAGRAMMING TOOL FOR HARDWARE CONFIGURATIONS

(71) Applicant: Compellent Technologies, Eden Prairie, MN (US)

(72) Inventors: Michael J. Schmit, Richfield, MN (US); David M. Hasseler, Prior Lake, MN (US)

(73) Assignee: Dell International, L.L.C., Round Rock, TX (US)

( * ) Notice: Subject to any disclaimer, the term of this patent is extended or adjusted under 35 U.S.C. 154(b) by 379 days.

(21) Appl. No.: 13/925,978

(22) Filed: Jun. 25, 2013

(65) Prior Publication Data

US 2014/0379898 A1 Dec. 25, 2014

(51) Int. Cl.
*H04L 12/801* (2013.01)
*H04L 12/24* (2006.01)
*H04L 12/26* (2006.01)

(52) U.S. Cl.
CPC .......... *H04L 41/22* (2013.01); *H04L 41/0856* (2013.01); *H04L 41/12* (2013.01); *H04L 43/0811* (2013.01)

(58) Field of Classification Search
CPC .................................................... H04L 47/10
See application file for complete search history.

(56) References Cited

U.S. PATENT DOCUMENTS

| | | | |
|---|---|---|---|
| 7,360,202 B1 * | 4/2008 | Seshadri et al. | 717/106 |
| 7,613,945 B2 | 11/2009 | Soran et al. | |
| 8,032,581 B2 * | 10/2011 | Hathorn et al. | 709/201 |
| 8,862,535 B1 * | 10/2014 | Talwadker et al. | 706/52 |
| 9,342,220 B2 * | 5/2016 | Basu | G06F 3/0484 |
| 2007/0044071 A1 * | 2/2007 | Hayles | G06F 8/38 717/113 |

* cited by examiner

*Primary Examiner* — Adnan Mirza
(74) *Attorney, Agent, or Firm* — Winthrop & Weinstine, P.A.

(57) ABSTRACT

A system and method for diagramming a remote hardware system. A method may include receiving data from a monitoring module about hardware components forming the remote hardware system, automatically organizing the data into a logical data structure, representative of the hardware components and communicative connections therebetween, and based on the logical data structure, automatically creating and outputting a visual diagram of the hardware components and the communicative connections therebetween to a display device, the diagram being a schematic representation of the remote hardware system's configuration. In one embodiment, connectivity errors may be automatically identified and flagged in the displayed diagram. Additionally, in some embodiments, the displayed diagram may be interactive, permitting manipulation of one or more of the hardware components or communicative connections therebetween.

20 Claims, 4 Drawing Sheets

VISUAL DIAGRAMMING TOOL FOR HARDWARE CONFIGURATIONS

FIELD OF THE INVENTION

The present disclosure relates to a visual diagramming tool for hardware configurations. Particularly, the present disclosure relates to diagramming hardware configurations, such as but not limited to, backend hardware configurations for a data storage center, in an interactive, graphic format. More particularly, the present disclosure relates to diagramming hardware configurations, such as but not limited to, backend hardware configurations for a data storage center, in an interactive, graphic diagram for analysis and support.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As such systems become more complex, efficient and effective support for these systems has become increasingly important. Hardware configuration and connectivity issues are common problem areas within such systems. Likewise, hardware and connection information is additionally useful in determining other problems in the system. In this regard, it can be useful for support staff to have access to information relating to a user's backend hardware and communication links and connectivity. Conventionally, support staff may obtain hardware and backend connectivity information directly from a consumer/user; however, this is not always that helpful as the consumer may not know the answers, may not be educated or trained as to what to look for, may not know how to identify and/or explain the hardware or connections clearly, etc. Additionally, the information may not be available, at least not immediately available, to the consumer, particularly where one or more of the system components are remotely located or are otherwise not readily visible. In more recent methods, raw backend hardware and connectivity information may be received electronically by automatically monitoring the backend hardware and connections therebetween. However, such raw information is typically received as basic table information, or other basic text format, and the support staff need to manually dig through the received raw information in order to determine the backend hardware and connectivity configuration. The process of manually digging through this text data and determining the backend configuration is tedious, taking upwards of two to three hours or more, and consumes valuable customer support resources, thus reducing the efficiency of the support staff and increasing the time needed for resolving support issues.

Thus, there is a need in the art for increasing support staff efficiency for determining the identification and configuration of a consumer user's backend hardware and connectivity. More particularly, there is a need for diagramming hardware configurations, such as but not limited to, backend hardware configurations for a data storage center, in an interactive, graphic format that may be generated quickly and may be easily referenced for analysis and support.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a method for diagramming a remote hardware system. The method may include receiving data from a monitoring module about hardware components forming the remote hardware system, automatically organizing the data into a logical data structure, representative of the hardware components and communicative connections therebetween, and based on the logical data structure, automatically creating and outputting a visual diagram of the hardware components and the communicative connections therebetween to a display device, the diagram being a schematic representation of the remote hardware system's configuration. In one embodiment, the remote hardware system may be a data storage system where the hardware components include a data storage system controller having one or more controller ports and a data storage device having one or more device ports. However, other remote hardware systems are contemplated. The data received from the monitoring module may generally include information relating to the hardware components forming the remote hardware system, information relating to how the hardware components are interconnected, and information relating to transport protocols utilized for the interconnections. However, other information may also be provided. In one embodiment, connectivity errors may be automatically identified and flagged in the displayed diagram. In still further embodiments, the controller ports and device ports may be rendered so as to separately indicate the status of each port. Likewise, the connections between the hardware components may also be rendered so as to separately indicate the status of each connection. In such embodiments, this may be accomplished by rendering the hardware components or connections utilizing different borders and fills and/or different line colors and types in the displayed diagram to represent different statuses. In some embodiments, the displayed diagram may be interactive, permitting manipulation of one or more of the hardware components or communicative connections therebetween. In additional embodiments, the displayed diagram may be saved in a format suitable for electronic transmission. The displayed diagram may be rendered utilizing scalable vector-based graphics. In further embodiments, the diagram may be rendered as a web page accessible over a network.

The present disclosure, in another embodiment, relates to an information handling system including a receiving and sorting module, communicatively coupled with a monitoring module, configured for receiving data from the monitoring module about hardware components forming a remote hardware system and automatically organizing the data into a logical data structure, representative of the hardware components and communicative connections therebetween. The information handling system may also include a rendering module configured to automatically create, based on the logical data structure, a schematic representation of the hardware components and the communicative connections therebetween and a display interface communicatively coupled with the rendering module and comprising a display device, the display interface configured to display the schematic representation of the hardware components and the communicative connections therebetween. In some embodiments, the information handling system may specifically include the monitoring module, the monitoring module being located at the remote hardware system. As an example embodiment, the remote hardware system may be a data storage system where the hardware components comprise a data storage system controller having one or more controller ports and a data storage device having one or more device ports. However, other remote hardware systems are contemplated. In some embodiments, the rendering module may be further configured to automatically identify connectivity errors in the schematic representation for display on the display interface. The displayed schematic representation may additionally be interactive, permitting manipulation of one or more of the hardware components or communicative connections therebetween.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

Figure 1:
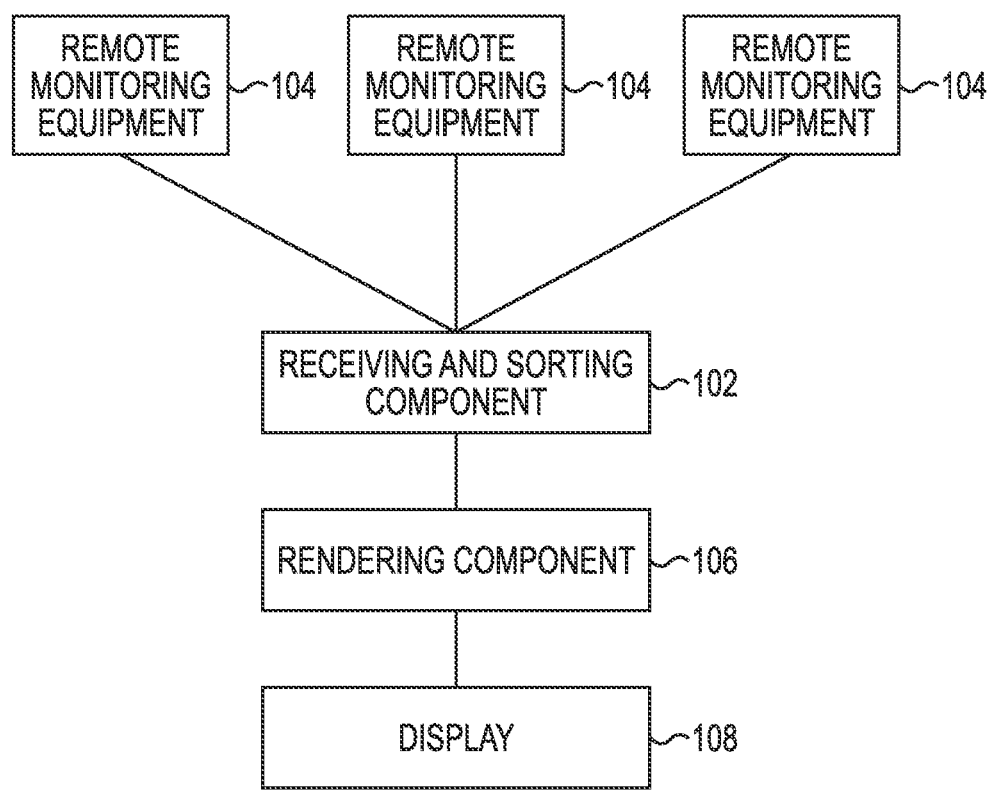
FIG. 1 is a schematic of a system incorporating a visual diagramming tool for hardware configurations, in accordance with an embodiment of the present disclosure.

The present disclosure relates to novel and advantageous visual diagramming tools for hardware configurations. Particularly, the present disclosure relates to novel and advantageous systems and methods for diagramming hardware configurations, such as but not limited to, backend hardware configurations for a data storage center, in an interactive, graphic format. More particularly, the present disclosure relates to novel and advantageous systems and methods for diagramming hardware configurations in an interactive, graphic diagram for analysis and support.

For purposes of this disclosure, any system or information handling system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU) or hardware or software control logic, and ROM and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

One or more programs or applications, such as a web browser, and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

As described above, as systems become more complex, hardware configuration and connectivity issues have increasingly become common problem areas and/or hardware and connectivity information has become increasingly useful in determining other problems in the system. Accordingly, it can be useful for support staff to have access to information relating to a consumer user's backend hardware and communication links or backend hardware and connectivity. In some more recent methods, raw backend hardware and connectivity information may be provided to support staff electronically by automatically monitoring the backend hardware and connections therebetween and sending the information to the support staff. However, such raw information is typically received as basic table information, or other basic text format, and the support staff need to manually dig through the received raw information to determine the backend hardware and connectivity configuration. This process of manually digging through the text data and determining the backend configuration is tedious, taking upwards of two to three hours or more, and consumes valuable customer support resources, thus reducing the efficiency of the support staff and increasing the time needed for resolving support issues.

The various embodiments of the present disclosure help increase support staff efficiency for determining the identification and configuration of a consumer's backend hardware and connectivity. More particularly, the various embodiments of the present disclosure diagram hardware configurations, such as but not limited to, backend hardware configurations for a data storage center, in an interactive, graphic format that may be generated quickly and may be easily referenced for analysis and support. In general, a manual and arduous process is replaceable by the various embodiments described herein for a visual diagramming tool, thereby eliminating the need for support staff to tediously rummage through raw configuration data and instead providing the support staff with an easy to view, interactive diagram of a consumer's backend hardware and connectivity configuration.

At a high level, the various embodiments of the present disclosure utilize equipment out in the field, or take advantage of equipment out in the field, to monitor consumer backend hardware, receive data from the monitoring equipment relating to the consumer backend hardware configurations at one or more central systems or service center systems, where support staff can gain access to the data, and produce an interactive, graphic format of the backend hardware configurations for quick and easy use by the support staff for analysis and support. In general, the various embodiments of the present disclosure may be broken into two components: a first component that grabs or receives the raw data from the monitoring equipment in the field and organizes the raw data into a logical data structure; and a second component that utilizes the logical data structure to render and output an interactive, visual diagram of the consumer's backend hardware configuration. Of course, the division into two components is only an example used for purposes of describing the various embodiments presented herein, but the different aspects of the various embodiments could instead be a provided as a single component or could be broken into more than two components, as would be understood by those skilled in the art.

More specifically, as illustrated in FIG. 1, as part of a first component of the various embodiments of the present disclosure, referred to herein as a receiving and sorting component 102, in response to a consumer's need for support and/or analysis of their hardware configuration, raw data may be received or polled from monitoring equipment 104 in communication with the consumer's hardware components. Typically, but not necessarily, the monitoring equipment may be remotely located from the receiving and sorting component 102, and in this regard, the receiving and sorting component and monitoring equipment 104 may be communicatively coupled, or may initiate and create a communicative coupling, wired or wireless, via any suitable means, such as via a local area network (LAN), a wide area network WAN such as the Internet, or any other available network. In additional or alternative embodiments, the monitoring equipment 104 may be configured to periodically or randomly send data relating to any given consumer's backend hardware back to a central database or collection of databases, where the receiving and sorting component 102 can access such data, when and if needed or desired. The data stored in the central database or collection of databases may additionally be useful for purposes outside of support. In one embodiment, particularly relating to supporting a data storage system, the consumer's hardware components may include, but are not limited to, one or more data storage management servers/controllers and one or more data storage devices or enclosures of multiple data storage devices. Of course, the various embodiments of the present disclosure are not limited to use in supporting data storage systems, but are applicable in supporting any suitable hardware system for which remote support assistance may be necessary or desirable.

In some embodiments, monitoring of the hardware is performed directly by the consumer's hardware components, such as by the consumer's controllers, while in other embodiments, particularly designed monitoring hardware and/or software may be provided to the consumer and/or included with the hardware components provided (e.g., sold or leased) to the consumer. The monitoring equipment 104 may generally monitor and store, among other things, hardware configuration data about the consumer's hardware components, including for example but not limited to, which hardware components the consumer has or is using, how the hardware components are communicatively coupled with one another, and/or the connection/transport protocols (e.g., Fibre Channel (FC), Small Computer System Interface (SCSI), Serial Attached SCSI (SAS), Advanced Technology Attachment (ATA), etc.) utilized. This configuration data may generally be raw data, being, for example but not limited to, in the format of long, run-on strings of port numbers corresponding to cables and port connections.

The raw configuration data obtained and stored by the monitoring equipment may, at some point, be sent to the receiving and sorting component 102. In some embodiments, the raw configuration data may be sent to the receiving and sorting component 102 upon request by the receiving and sorting component, or otherwise on-demand. In other embodiments, the raw configuration data may be sent to, or received by, the receiving and sorting component 102 at any time, and according to any schedule, such as but not limited to, randomly, continuously, periodically, etc. However, for the sake of efficiently using available resources, the raw configuration data, in many embodiments, will be sent upon request by the receiving and sorting component. According to an embodiment of the present disclosure, the receiving and sorting component 102 may store the received raw configuration data, in its raw format, in an accessible database or other suitable memory location.

While the raw configuration data could be reviewed manually by, for example, support staff, the amount of time and effort required to review the raw configuration data and develop a comprehensible mapping of the consumer's hardware configuration is largely inefficient, often taking 2-3 hours or more of support staff time, thereby decreasing support quality and efficiency. Accordingly, in one embodiment of the present disclosure, the receiving and sorting component 102 may automatically retrieve the stored raw configuration data and sort the raw data to determine the consumer's hardware components and extract the connection information corresponding to those hardware components. That is, the receiving and sorting component 102 may process the raw configuration data and resolve the raw data down to the port-to-port connections between the various identified hardware components/devices, along with any other suitable or desirable information, such as any additional details about the connection that may help provide support to the consumer. In one embodiment, again particularly relating to supporting a data storage system, the sorted information may identify a consumer's data storage system controllers and associated one or more controller cards having one or more ports, a consumer's data storage device enclosures and associated one or more data storage device modules also having one or more ports, and each of the connections therebetween, such as but not limited to the FC and SAS connections between the ports of the consumer's controllers and enclosures. However, the various embodiments of the present disclosure are not limited to supporting data storage systems, and as noted above, are applicable in supporting any suitable hardware system for which remote support assistance may be necessary or desirable. Accordingly, the hardware components are not limited to data storage system controllers and data storage devices/enclosures.

In one embodiment, additional information that may be determined or inferred from the raw configuration data by the receiving and sorting component 102 may include the identification of any connection errors, such as but not limited to, a cabling error (e.g., incorrect cabling) or a bad connection (e.g., bad cable). In this manner, the system may automatically identify certain backend connectivity issues. In addition to such connectivity issues, the receiving and sorting component 102, in some embodiments, may also determine whether "best practice" guidelines are being utilized by the consumer, whether the backend cabling is truly redundant for controller failovers, and/or whether other specified or predetermined error scenarios exist in the consumer's current hardware configuration. Such other error scenarios may vary depending on the type of hardware and connections making up the consumer's system, and as such may be particularly defined and configured for supporting any type of hardware system.

After receiving the raw configuration data from the monitoring equipment 104 and resolving the raw configuration data into a more comprehensive format delineating the consumer's hardware components and connections therebetween, the receiving and sorting component may organize the data into a logical data structure for efficient access by the second component of the various embodiments of the present disclosure, referred to herein as the rendering component 106. The organized logical data structure may be any suitable data structure now known or later developed, including but not limited to, any suitable logical tree structure. In one embodiment, the logical data structure may generally be representative of the consumer's backend hardware configuration, and thus, can be readily traversed in order to render a mapping of the consumer's hardware.

Turning now to the second component, in general, the rendering component 106 may utilize or traverse the logical data structure storing the resolved configuration data and render/output a visual diagram of the consumer's backend hardware configuration to one or more display interfaces 108 or display 108 communicatively coupled with the rendering component, such as a display device for support staff and/or a display device for the consumer. In one embodiment, only support staff may have access to the displayed hardware diagram. However, in other embodiments, the hardware diagram may be additionally, or alternatively, displayed to the consumer and/or any other desired user, and in some cases may be transmitted for display over a communications network, such as the Internet. In one embodiment, the visual output may be interactive, thus being manipulatable and/or modifiable, for example, by the support staff and/or the consumer or other user to further aid in resolving the consumer's backend connectivity issues or concerns. In this manner, support staff may efficiently assist the consumer from remote locations.

Figure 2:
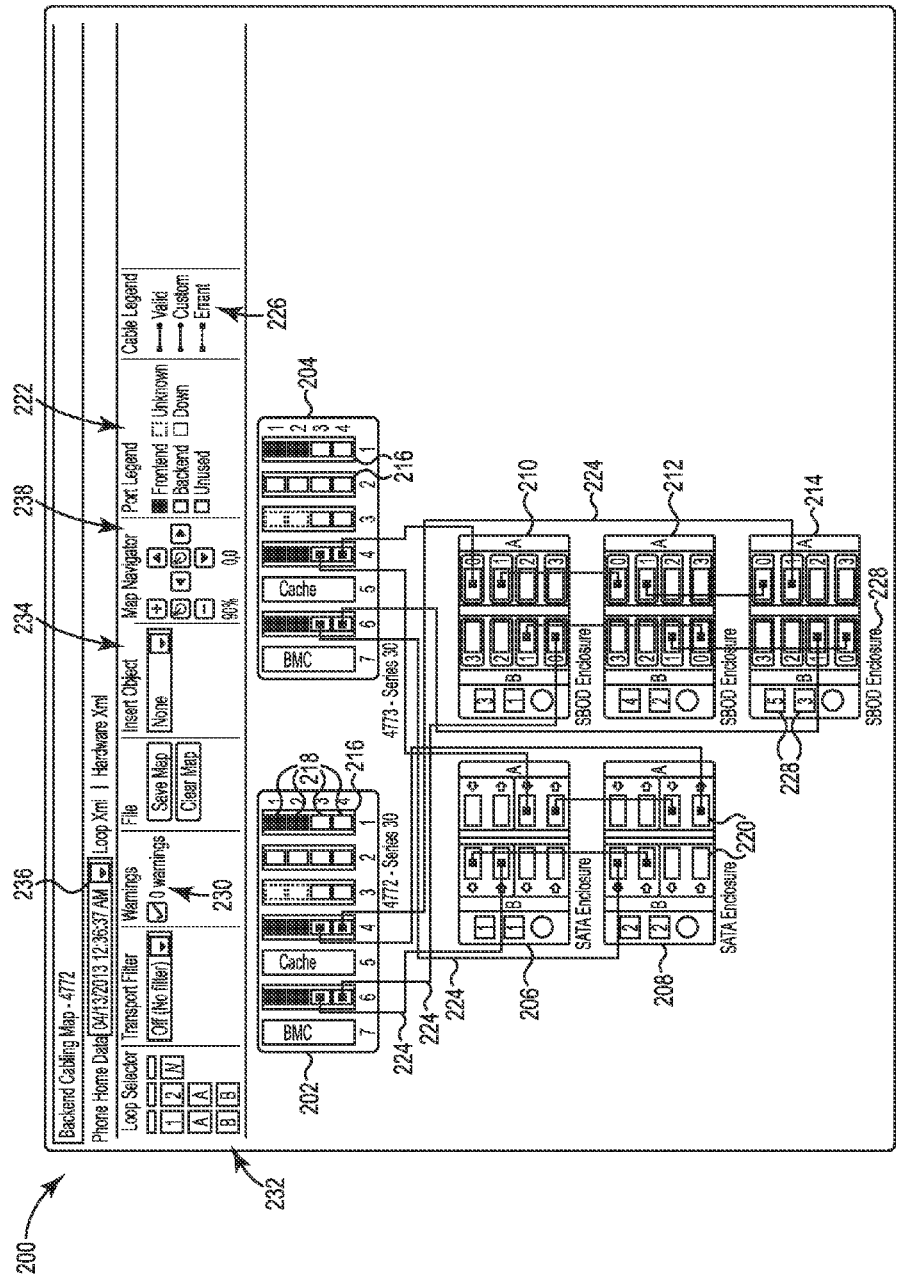
FIG. 2 is a graphic diagram of a backend configuration, in accordance with an embodiment of the present disclosure.

More specifically, in one embodiment, the rendering component 106 may utilize or traverse the logical data structure to identify each of the consumer's hardware components for display. In an embodiment where the logical data structure is a tree, the rendering component 106 may simply traverse the tree to identify the consumer's hardware components. Each of the hardware components may be stand-alone components or be subcomponents of larger hardware devices. For example, in one embodiment, again particularly relating to supporting a data storage system, the hardware components determined from the logical data structure may include, but are not limited to, one or more data storage system controllers, each having one or more controller cards, and one or more data storage device enclosures, each having one or more data storage device. Each of the controller cards and data storage enclosures may include one or more ports, which may also be identified by the rendering component 106 from the logical data structure. As illustrated in FIG. 2, which illustrates a sample hardware configuration mapping 200, the rendering component 106 may determine a meaningful layout for the hardware components and render or output a representative schematic, diagram, or other illustration of each of the consumer's hardware components to a display interface or device based on the determined layout. In the embodiment of FIG. 2, for example, the rendering component 106 rendered two data storage system controllers 202, 204, and five data storage device enclosures 206, 208, 210, 212, 214. In the illustrated embodiment, each data storage system controller has five controller cards 216, among other components such as cache, with each controller card having four ports 218. Each of the five data storage device enclosures 206, 208, 210, 212, 214 in the illustrated embodiment includes two data storage modules (identified as A and B, in this case), with each module having four ports 220. Of course, this is but one simple example utilized for the ease of discussion. In other embodiments, the data storage system controllers need not be identical nor include the same number of cards and ports. Likewise, the data storage device enclosures need not be identical nor include the same number of modules or ports. Further yet, as noted above, the various embodiments of the present disclosure are not limited to supporting data storage systems, and as such, are applicable in supporting any suitable hardware system for which remote support assistance may be necessary or desirable. In this regard, the hardware components illustrated in FIG. 2 are not limiting, but are meant solely to help illustrate the various embodiments of the present disclosure.

The layout of the hardware components in the diagram need not be representative of the relative physical locations of the consumer's hardware. Rather, in one embodiment, the layout of the hardware components may instead be logically designed so as to position the components in a manner where communicatively connected components are organized in like fashion. For example, in the embodiment of FIG. 2, data storage enclosures connected in the same storage loop are laid out in the diagram in the same column. Of course, such a layout is only one example, and many other organized layouts for the hardware components may be effectively utilized.

In one embodiment, the configuration mapping 200 may schematically render each port in a manner indicative of the port's current status, according to, for example, a predetermined port rendering scheme. In one particular embodiment, illustrated in FIG. 2, the port rendering scheme may utilize different borders and/or fills to indicate the status of each port. For example, as shown in FIG. 2, frontend ports, backend ports, unused ports, ports that are down, and ports for which the status is unknown are each differentiated in the configuration mapping 200 based on different colors and/or styles of the border and/or fill for each port. However, any other method of differentiating schematic elements from one another may be utilized. Furthermore, the status identifiers used herein are provided solely as examples and are not meant to be limiting; indeed, any suitable number and variety of port status identifiers may be utilized. A port legend 222 may be provided on the display to which the support staff or consumer may refer, if needed or desired, in order to determine the status of any given port. The status of any port may be updated automatically based on interactive actions, described in further detail below, taken by the support staff, consumer, and/or other user.

The rendering component 106 may also utilize or traverse the logical data structure to identify each of the connections between the consumer's hardware components. Again, in an embodiment where the logical data structure is a tree, the rendering component 106 may simply traverse the tree to identify these connections. In the example embodiment particularly relating to supporting a data storage system, the connections determined may include, but are not limited to, the port-to-port connections between the one or more data storage system controller cards and the one or more data storage device enclosures. As illustrated in the sample hardware configuration mapping 200 of FIG. 2, the rendering component 106 may determine a meaningful layout for the connections/cabling among the rendered hardware components and render or output a representative schematic or other illustration for each of the connections to a display interface or device based on the determined layout. In the embodiment of FIG. 2, for example, the rendering component 106 rendered fourteen connections 224, with four ports from each controller and each storage device enclosure schematically illustrated with a cable coupled thereto. Again, this is but one simple example utilized for the ease of discussion. In other embodiments, more or less connections may be utilized by the consumer's system, and thus more or less connections may be correspondingly illustrated in the configuration mapping 200 of FIG. 2.

As with the layout of the hardware components, the layout of the connections in the diagram need not be representative of the relative physical locations or lengths of the consumer's cables. Rather, in one embodiment, the layout of the connections, or cables, may instead be logically designed so as to avoid crossing the hardware components in the diagram and/or to cleanly illustrate the connections. For example, in the embodiment of FIG. 2, the connections are illustrated in a manner not unlike the wires and connections in an electrical circuit schematic, with only 90 degree turns and crossing other components and connections in a limited manner. Of course, such a layout is only one example, and many other organized layouts for the connections, or cables, may be effectively utilized.

In one embodiment, the configuration mapping 200 may schematically render each connection/cable in a manner indicative of the connection's current status, according to, for example, a predetermined connection rendering scheme. In one particular embodiment, illustrated in FIG. 2, the connection rendering scheme may utilize different line colors and/or types to indicate the status of each connection. For example, as shown in FIG. 2, valid connections, errant connections, and custom connections are each differentiated in the configuration mapping 200 based on different line colors and/or styles. However, any other method of differentiating schematic elements from one another may be utilized. Furthermore, the status identifiers used herein are provided solely as examples and are not meant to be limiting; indeed, any suitable number and variety of connection status identifies may be utilized. A connection/cable legend 226 may be provided on the display to which the support staff or consumer may refer, if needed or desired, in order to determine the status of any given connection. The status of any connection may be updated automatically based on interactive actions, described in further detail below, taken by the support staff, consumer, and/or other user.

Although described above with respect to ports and connections, similar predetermined status identifiers may be provided for other hardware components and subcomponents, including entire hardware devices, in like manner. As with the port and connection status identifiers, any method of differentiating schematic elements from one another may be utilized to indicate the component status.

Although described as rendering the hardware components prior to rendering the connections/cabling, this order is not required. Rather, the hardware components may be rendered prior to, subsequent to, or simultaneously with, the corresponding connections.

In some embodiments, additional data or "micro" data 228 may be included with the rendered output and attached to some or all of the hardware components and/or connections. The additional data 228 may vary depending on the hardware component or connection, but could include information such as, for example but not limited to, world wide name (WWN) or world wide identifier (WWID) for the component, controller card type, port type, port usage, component status, connection speed, firmware version, and/or any other suitable or desirable information. In some embodiments, the additional data may be readily visible (e.g., 228) on the display of the configuration mapping 200. In other embodiments, however, the additional data for a given component or connection may be viewed by "mousing" over the component or connection or clicking on the component or connection in the configuration mapping 200. In still other embodiments, there may be a combination of data that is readily visible and data that is viewable only upon "mousing" over or clicking on the corresponding component or connection.

Figure 3:
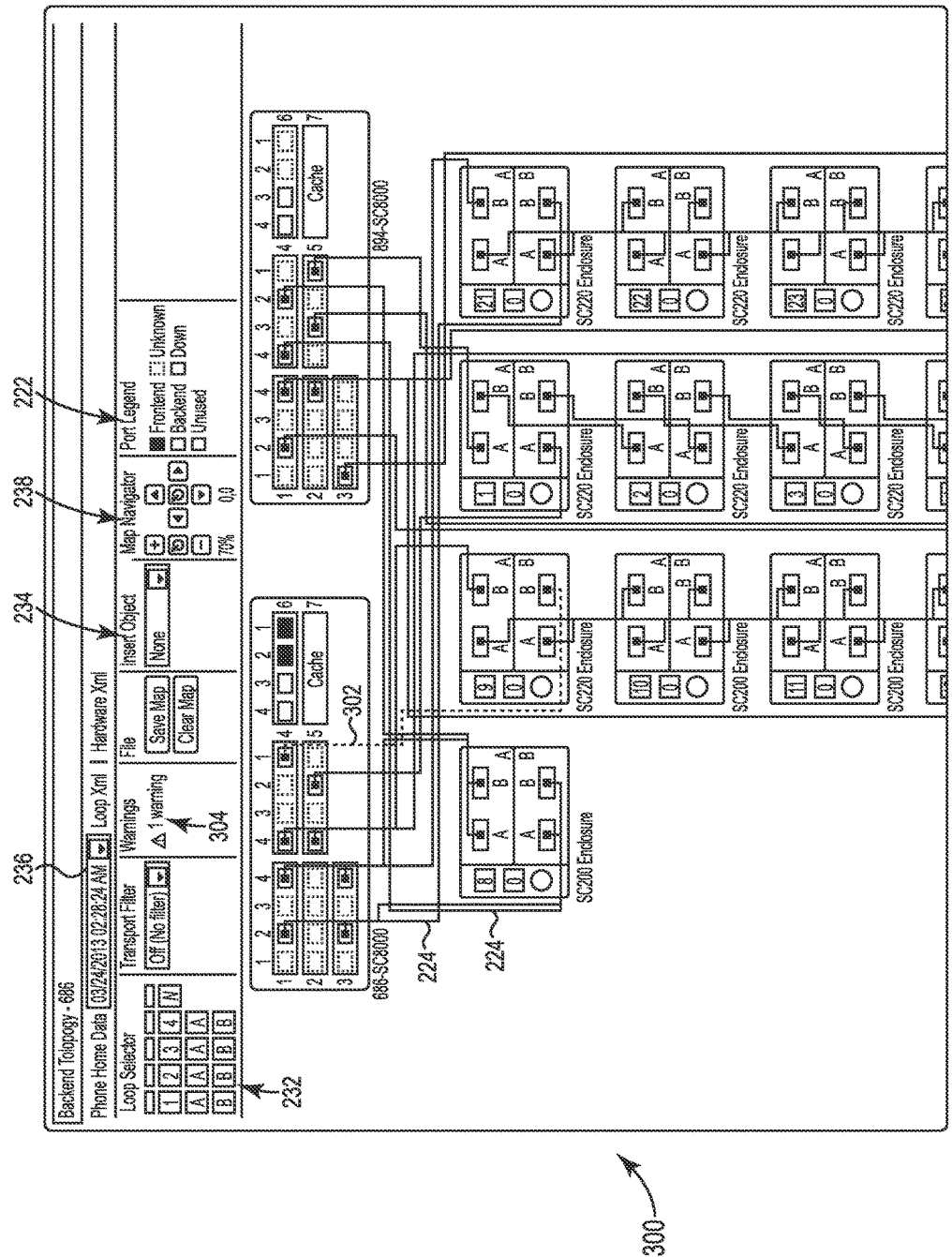
FIG. 3 is a graphic diagram of a backend configuration, in accordance with another embodiment of the present disclosure, illustrating a potential cabling error.

In one embodiment, known or identified error conditions in the rendered components and connections may be flagged on the displayed configuration mapping for the support staff and/or consumer. Known or identified error conditions may include, for example but are not limited to, a missing cable, a bad cable, incorrect cabling, a connection loop that starts and ends on the same data storage system controller, a down port, a down controller card, a down controller, a down storage device, a down storage device enclosure, etc. Other error conditions or scenarios may vary depending on the type of hardware and connections making up the consumer's system, and as such may be particularly defined and configured for supporting any type of hardware system, not just the data storage system provided as an example herein. As indicated above, some error conditions, such as down ports and connections, may be flagged simply based on a predetermined rendering scheme (e.g., the port rendering scheme or connection rendering scheme), which causes such ports, connections, etc. to be schematically illustrated differently for quick and easy identification. Alternatively or additionally, in one embodiment, a warnings indicator 230 may be provided on the configuration mapping 200 to signal any known or identified errors or potential errors. The warnings indicator 230 may provide any suitable or desirable information, including but not limited to, the number of warnings or errors identified and/or an explanation of the identified warning or error. In some embodiments, extra details about any warning provided may be discovered by, for example but not limited to, "mousing" over the warning or clicking on the warning. FIG. 3 illustrates another example configuration mapping 300 in which an errant cabling connection 302 has been identified, and a warning 304 has been provided.

In the example embodiment of FIG. 2, which particularly illustrates a configuration mapping 200 for a consumer's data storage system, storage loops or portions of the storage loops may be automatically identified and may be selectively shown, highlighted, or hidden, for example, based on connection or transport type. Of course, the storage loops may also be selectively shown, highlighted, or hidden for any other suitable reason. The storage loops or loop portions, in one embodiment, may be selectively shown, highlighted, or hidden utilizing a loop selector tool 232. The loop selector tool 232 may automatically identify various storage loops or loop portions for selection. In one embodiment, the connections and storage loops may be color-coded, or otherwise uniquely identified, in the configuration mapping 200, for example, for ease of identification. The loop selector tool 232 may also use the corresponding color-coding for ease of correlation between loops in the diagram and identified in the selector tool. While discussed with respect to an example data storage system having storage loops, those skilled in the art will appreciate the application of connection loop identification and selection to other hardware systems, and the present disclosure is not limited to application solely in data storage systems.

In one embodiment, the configuration mapping 200 may be interactive. Specifically, in some embodiments, the support staff, consumer, and/or other user may be able to manipulate the various hardware components and connections in order to, such as but not limited to: move, delete, add, modify, and/or replace hardware components; move, delete, add, modify, and/or replace connections/cables; customize hardware components and/or connections; clear the entire mapping; creating, adding, and/or modifying template configurations or template components; etc. In further embodiments, the configuration mapping 200 may permit the support staff, consumer, and/or other user to "draw" free-hand on the display (e.g., via touch-screen, mouse, or other input device). In general, anything rendered in the configuration mapping 200 that can be made suitably interactive may be configured so as to be manipulatable. In one embodiment, the configuration mapping 200 may include an insert tool 234 that provides the ability to add additional components/objects to the displayed configuration. Although not limited to such, in one embodiment, the insert tool 234 may be a predetermined list (e.g., a pre-populated drop-down menu) from which an object may be selected for insertion onto the displayed configuration. Having the ability to interactively manipulate and modify the mapping configuration boosts the ability of support staff to effectively and efficiently troubleshoot the consumer's hardware configuration issues as well as handle the consumer's issues remotely with relative ease.

At any given time, the current state of the configuration diagram may be saved. In additional embodiments, the saved diagram may be transmitted to the consumer and/or any other users, such as field technicians, if desired. The saved diagram may be transmitted to the consumer or other users by any conventional means, including traditional mail. However, in one embodiment, the diagram may be transmitted electronically to the consumer or other users, such as by, but not limited to, email or direct download from, for example, the display interface. In still a further embodiment, the saved diagram may be downloaded to an offline HTML page, which may then be easily accessible even without a network connection. In additional or alternative embodiments, the complete topology and cabling information could be saved as a data file, such as a XML data file, for easy transportability and increased compatibility. In one embodiment, the configuration mapping 200 may provide a means for accessing, such as a link to, the XML code corresponding to the hardware components and/or the identified loops.

In some embodiments, the configuration mapping 200 may include a date selector 236, such as where configuration mappings from different dates/times have been rendered or completed, which permits support staff, the consumer, and/or other user to select, for example, via a pre-populated drop-down menu, radio button list, etc., and view the different configuration mappings for the different dates/times. In some embodiments, the different configuration mappings may be rendered in different browser tabs or windows, such that the mappings may be easily compared. Having the ability to view past configuration mappings can increase the ability to diagnose and resolve hardware and connection issues.

In one embodiment, the configuration mapping 200, and more particularly in some embodiments, the hardware components and connections illustrated therein, may be rendered utilizing scalable vector-based graphics, such that the displayed diagram may be panned and zoomed with generally no resolution loss. However, other graphic rendering methods, such as pixel-based, or combinations of graphic rendering methods may nonetheless be utilized and are considered entirely within the scope of the present disclosure. A map navigation tool 238 may be provided that permits a viewer of the configuration mapping to navigate around the displayed diagram. In one embodiment, for example, the map navigation tool 238 may permit the viewer to pan in one or more directions, zoom in or out, center the diagram, and/or rotate the diagram. However, more or less navigational actions may be provided and/or permitted, as desired.

As described above, the various embodiments of the present disclosure may be provided as any combination of hardware and software components. In one embodiment, however, at least a portion of the receiving and sorting component and/or rendering component may be provided as a web-based application, which may permit easier accessibility to support staff, consumers, and/or other users. In a more particular embodiment, at least a portion of the receiving and sorting component and/or the rendering component may be provided as a .Net web service and may build XML from the logical data structure of configuration data in order to render the configuration mapping of the consumer's hardware components as a viewable and interactive web page accessible over a network, such as the Internet. While any programming languages may be used, as indicated above, in one embodiment, the software aspects of the present disclosure may be coded, at least in part, using .Net and Javascript.

The various embodiments of the present disclosure are advantageous for a variety of reasons, including but not limited to, improving the speed and efficiency of system analysis and support and reducing costs associated with support. Specifically, the various embodiments of the present disclosure can save 2-3 hours or more of manual labor typically set aside for reviewing and diagramming consumer backend systems from raw system information, thereby reducing the amount of time it takes to resolve consumer support issues, and increasing consumer satisfaction. Additionally, the 2-3 hours or more savings in time, which can be performed using the various embodiments of the present disclosure in a matter of seconds, translates to a significant amount of cost savings, which depending on the size of the company and support required by consumers, can range in the millions of dollars. Other advantages may of course be appreciated by those skilled in the art.

The various embodiments herein have been described with respect to information handling systems. While the various embodiments are not limited to any particular type of information handling system, the systems and methods of the present disclosure may be particularly useful in the context of a storage center comprising mass storage devices, such as but not limited to disk drive systems, or virtual disk drive systems, such as that described in U.S. Pat. No. 7,613,945, titled "Virtual Disk Drive System and Method," issued Nov. 3, 2009, the entirety of which is hereby incorporated herein by reference.

Figure 4:
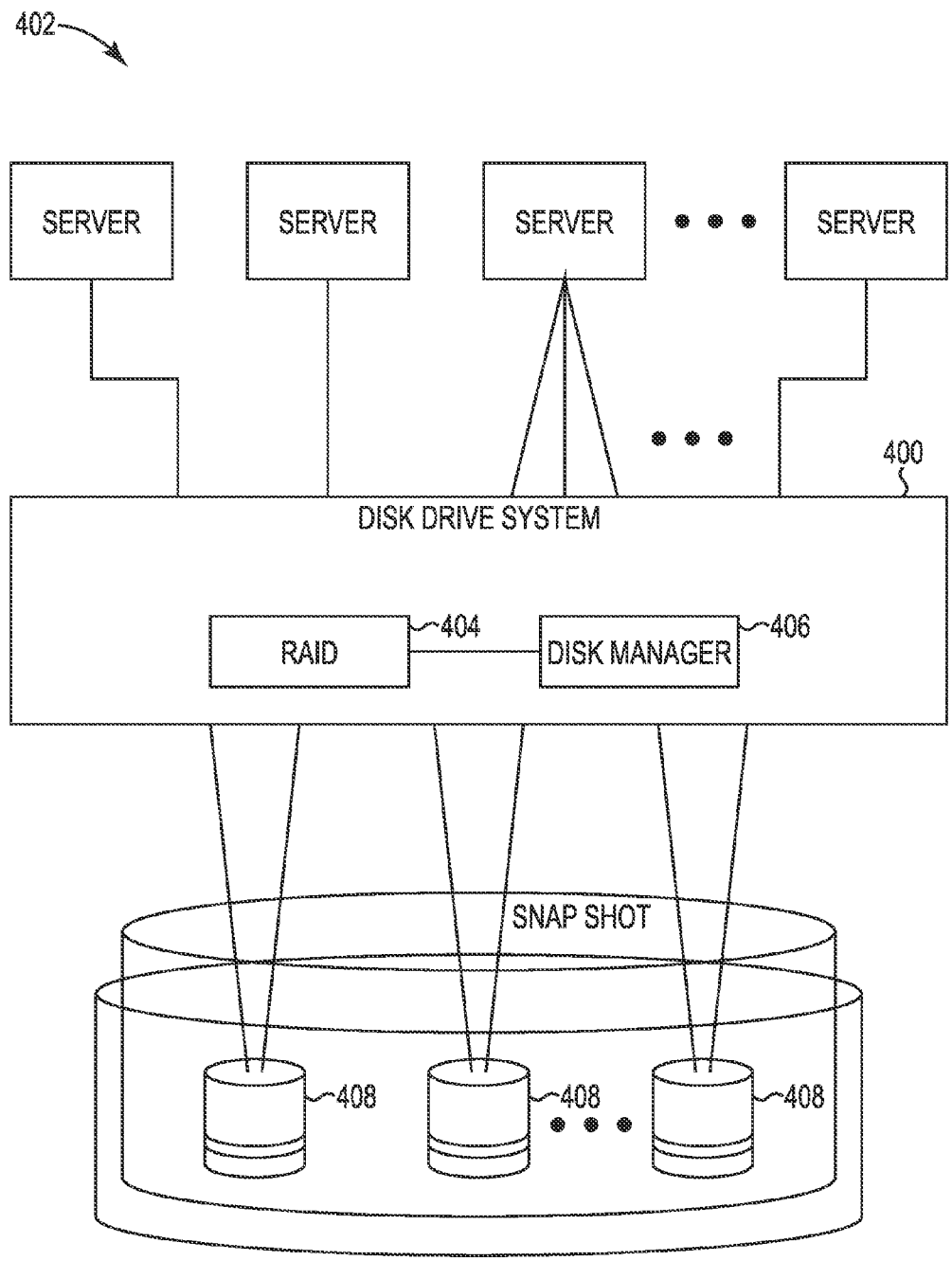
FIG. 4 is a schematic diagram of a data storage system that may benefit from the diagramming tool of the present disclosure.

FIG. 4 illustrates one embodiment of a disk drive or data storage system 400 in an information handling system environment 402, such as that disclosed in U.S. Pat. No. 7,613,945, and suitable with the various embodiments of the present disclosure. As shown in FIG. 4, the disk drive system 400 may include a data storage subsystem 404, which may include, but is not limited to, a RAID subsystem, as will be appreciated by those skilled in the art, and a disk manager 406 having at least one disk storage system controller. The data storage subsystem 404 and disk manager 406 can dynamically allocate data across disk space of a plurality of disk drives or other suitable storage devices 408, such as but not limited to optical drives, solid state drives, tape drives, etc., based on, for example, RAID-to-disk mapping or other storage mapping technique. The data storage subsystem 404 may include data storage devices distributed across one or more data sites at one or more physical locations, which may be network connected. Any of the data sites may include original and/or replicated data (e.g., data replicated from any of the other data sites) and data may be exchanged between the data sites as desired.

The various embodiments of the present disclosure may be utilized for supporting such, or similar, storage centers. Indeed, upon need or desire to identify the backend hardware and/or connectivity of a consumer's system, such as during a support call, the embodiments disclosed herein may be utilized to determine the backend hardware, such as but not limited to, any controllers, disk managers, or storage devices, being employed by the particular consumer and the connections therebetween, and present this information in a visual, interactive diagram for quick deployment by the support staff.

In the foregoing description, various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A method for diagramming a remote hardware system, the method comprising:
   receiving data from one or more monitoring modules about hardware components forming the remote hardware system;
   automatically organizing the data into a logical data structure, representative of the hardware components and communicative connections therebetween; and
   based on the logical data structure, automatically creating and outputting a visual diagram of the hardware components and the communicative connections therebetween to a display device, the diagram being a schematic representation of the remote hardware system's configuration.

2. The method of claim 1, wherein the remote hardware system is a data storage system and the hardware components comprise a data storage system controller having one or more controller ports and a data storage device having one or more device ports.

3. The method of claim 1, wherein the data received from the one or more monitoring modules comprises information relating to the hardware components forming the remote hardware system, information relating to how the hardware components are interconnected, and information relating to transport protocols utilized for the interconnections.

4. The method of claim 1, further comprising requesting data about the hardware components forming the remote hardware system from the one or more monitoring modules.

5. The method of claim 1, further comprising automatically identifying connectivity errors and flagging the errors in the displayed diagram.

6. The method of claim 2, further comprising rendering each of the one or more controller ports and device ports so as to separately indicate the status of each port.

7. The method of claim 6, wherein rendering each of the one or more controller ports and device ports so as to separately indicate the status of each port comprises rendering the one or more controller ports and device ports according to a port rendering scheme utilizing at least one of different borders and different fills in the displayed diagram to represent different port statuses.

8. The method of claim 1, further comprising rendering each of the communicative connections between the hardware components so as to separately indicate the status of each connection.

9. The method of claim 8, wherein rendering each of the communicative connections so as to separately indicate the status of each connection comprises rendering the connections according to a connection rendering scheme utilizing at least one of different line colors and different line types in the displayed diagram to represent different connection statuses.

10. The method of claim 1, wherein automatically creating and outputting a visual diagram comprises:

identifying the hardware components from the logical data structure;

identifying the connections between the hardware components from the logical data structure; and determining a suitable layout for illustrating the hardware components and connections therebetween in the displayed diagram.

11. The method of claim 10, wherein the displayed diagram is interactive, permitting manipulation of one or more of the hardware components or communicative connections therebetween.

12. The method of claim 11, wherein the manipulation of one or more of the hardware components or communicative connections therebetween comprises at least one of moving, modifying, and deleting the one or more of the hardware components or communicative connections therebetween.

13. The method of claim 11, further comprising saving the displayed diagram in a format suitable for electronic transmission.

14. The method of claim 1, wherein creating and outputting a visual diagram of the hardware components and the communicative connections therebetween to a display device, comprises rendering the visual diagram utilizing scalable vector-based graphics.

15. The method of claim 1, wherein creating and outputting a visual diagram of the hardware components and the communicative connections therebetween comprises rendering the visual diagram as a web page accessible over a network.

16. An information handling system comprising:

a receiving and sorting module, communicatively coupled with one or more monitoring modules, configured for receiving data from the one or more monitoring modules about hardware components forming a remote hardware system and automatically organizing the data into a logical data structure, representative of the hardware components and communicative connections therebetween;

a rendering module configured to automatically create, based on the logical data structure, a schematic representation of the hardware components and the communicative connections therebetween; and a display interface communicatively coupled with the rendering module and comprising a display device, the display interface configured to display the schematic representation of the hardware components and the communicative connections therebetween.

17. The information handling system of claim 16, further comprising the one or more monitoring modules, the one or more monitoring modules being located at the remote hardware system.

18. The information handling system of claim 16, wherein the remote hardware system is a data storage system and the hardware components comprise a data storage system controller having one or more controller ports and a data storage device having one or more device ports.

19. The information handling system of claim 16, wherein the rendering module is further configured to automatically identify connectivity errors in the schematic representation for display on the display interface.

20. The information handling system of claim 16, wherein the displayed schematic representation is interactive, permitting manipulation of one or more of the hardware components or communicative connections therebetween.

\* \* \* \* \*